Patented Nov. 19, 1935

2,021,412

UNITED STATES PATENT OFFICE 2,021,412

REACTING CAUSTIC LIME WITH GYPSUM

Chester G. Gilbert, Washington, D. C., assignor, by mesne assignments, to Parker C. Choate, Essex, Mass.

No Drawing. Application September 2, 1930, Serial No. 479,317. Renewed January 8, 1935

1 Claim. (Cl. 106—34)

This specification involves an exothermic reaction between caustic lime (CaO) and gypsum rock (CaSO$_4$,2H$_2$O), when admixed in crushed masses of fine or granulated particles.

The exothermic balance in reaction is based on the fact that the hydration of CaO generates much more mass temperature than is consumed by the dehydration of CaSO$_4$,2H$_2$O.

To initiate reaction in a small portion of the mass, it must be heated extraneously to a temperature whereby H$_2$O as vapor is liberated from gypsum, which H$_2$O finds adjacent lime with which to unite. The propagation of the exothermic balance at reactive temperature of above 80° C., and often reaching 200° C., follows rapidly, as a consequence of chemical reaction.

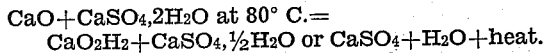

The above formula illustrates the reaction which is inert at normal temperature of a mixture, but forms the CaSO$_4$,½H$_2$O calcine below 149° C., and CaSO$_4$ above 149° C.

When properly reacted, and the product made homogeneous by grinding, a building plaster is formed consisting of a reacted mixture of lime hydrate and calcined gypsum, desirable in trade.

The proportions of CaO to gypsum as admixed, are variable, based on the proportion of lime hydrate desired in the product.

Usually the CaO used is in excess of that able to absorb all the H$_2$O contained in the gypsum, and after reaction steam is added to hydrate excess CaO or react with the desiccant CaSO$_4$.

In theory all the H$_2$O may be absorbed to form CaO$_2$H$_2$, but due to physical mass action, some escapes as free H$_2$O, but not enough to aerate the mass in reaction, and if any material mass pressure exists, due to depths of mass-gravity above a foot or so of depth, or compacting movements, such as stirring or moving, by feed screws, is practiced, there is a great risk of forming pasty coherent masses, enabling very uneven propagated temperature, with formation of pockets of H$_2$O vapor, resulting in mass explosions.

Fine grinding of the products prior to the reaction are detrimental to a homogeneous reaction, so that the mixture for reaction is best sized, as the issue of a hammer mill product, up to one-half inch in cross section of pieces with fines.

The process can be conducted in a container where heat can be applied at or near the bottom thereof by any means, as a gas burner.

Other means of initiating the reaction can of course be used, as will readily be apparent to those skilled in the art.

I therefore do not limit my process to any specific means or method of initiating reaction.

Varied forms of apparatus may be used, and varied means of temperature initiation specified, with varied sizing of mass particles, to be reacted.

The particles as reacted by interchange or contact with H$_2$O vapor, disintegrate into an impalpable powder.

Operativeness commercially involves the maintenance of voids or aeration, avoiding packing or mass compression, which causes pasty coherent masses.

Limes and gypsums differ widely in their physical behavior, also rate of reaction in mass mixtures, so that only empirical tests can establish practice.

This invention consists in the discovery of initiation of temperature of reaction in a small part of a mixed mass, allowing propagation of such initiated reaction temperature through the mass.

No mass movement is specified, and will usually defeat the purpose.

Operative conditions to better control homogeneity and produce quality constitute separate inventive acts.

I claim:

The process of reacting caustic lime and gypsum, which consists in providing an intermingled mass of such reagents, initiating reaction in a limited portion of such mass, and permitting the reaction to propagate itself through the mass, until the heat of reaction has calcined the gypsum, and the water expelled from the gypsum, in calcination, has hydrated the lime.

CHESTER G. GILBERT.